US006760373B2

(12) United States Patent
Gross et al.

(10) Patent No.: US 6,760,373 B2
(45) Date of Patent: Jul. 6, 2004

(54) SYSTEMS AND METHODS FOR MULTICARRIER MODULATION USING MULTI-TAP FREQUENCY-DOMAIN EQUALIZER AND DECISION FEEDBACK

(75) Inventors: Richard W. Gross, Acton, MA (US); Yan Yang, Littleton, MA (US); Mei Yong, Acton, MA (US); Stuart Sandberg, Acton, MA (US); Arnon Friedmann, Marlboro, MA (US)

(73) Assignee: Aware, Inc., Bedford, MA (US)

( * ) Notice: Subject to any disclaimer, the term of this patent is extended or adjusted under 35 U.S.C. 154(b) by 0 days.

(21) Appl. No.: 10/211,425

(22) Filed: Aug. 2, 2002

(65) Prior Publication Data

US 2003/0067865 A1 Apr. 10, 2003

Related U.S. Application Data

(60) Provisional application No. 60/309,631, filed on Aug. 2, 2001.

(51) Int. Cl.$^7$ ............................. H03H 7/40; H04J 11/00
(52) U.S. Cl. ....................... 375/232; 375/239; 375/348; 370/203
(58) Field of Search ................................. 375/239, 348, 375/232, 229; 370/203

(56) References Cited

U.S. PATENT DOCUMENTS

| | | | |
|---|---|---|---|
| 5,636,246 A | | 6/1997 | Tzannes et al. |
| 6,226,322 B1 | * | 5/2001 | Mukherjee .................. 375/229 |
| 6,295,326 B1 | | 9/2001 | Tonissen et al. |
| 6,389,062 B1 | | 5/2002 | Wu |
| 6,400,781 B1 | | 6/2002 | Vandendorpe et al. |

OTHER PUBLICATIONS

International Search Report.
"Draft New Recommendation G.992.1: Asymmetrical Digital Subscriber Line (ADSL) Transceivers—Approved" *Editor Recommendation G.991.1 (ex G.dmt)*, International Telecommunication Union, Telecommunication Standardization Sector, Study Period 1997–2000 Jul., 1999, 264 pages.
Stuart D. Sandberg and Michael A. Tzannes, "Overlapped Discrete Multitone Modulation for High Speed Copper Wire Communications", *Aware, Inc.*, 24 pages with references.
M.A. Tzannes, "System Design Issues for the DWMT Transceiver", *Aware, Incorporated*, Standards Project: T1E.4: ADSL, Apr. 14, 1993, 5 pages.
M.A. Tzannes, "The DWMT: A Multicarrier Transceiver for ADSL Using M—band Wavelet Transforms" *Aware, Incorporated*, Standards Project: T1E1.4: ADSL, Mar. 8, 1993, 16 pages.
"PROJECT: Standards Project for Interfaces Relating to Carrier to Customer Connection of Asymmetrical Digital Subscriber Line (ADSL) Equipment" *Editor*, TITLE: T1.413 Issue 2, 248 pages.
Michael A. Tzannes, M. C. Tzannes, J. Proakis, P. N. Heller., "DMT Systems, DWMT Systems and Digital Filter Banks", Proc. ICC 1994.

* cited by examiner

*Primary Examiner*—Temesghen Ghebretinsae
*Assistant Examiner*—Pankaj Kumar
(74) *Attorney, Agent, or Firm*—Miles & Stockbridge P.C.; Jason H. Vick

(57) ABSTRACT

Through the use of feedback in determining frequency domain equalization, intersymbol interference can be reduced. Specifically, the determined constellation point closest to the determined received point can be fed back to aid in determining one or more other closest constellation points.

4 Claims, 4 Drawing Sheets

SYSTEMS AND METHODS FOR MULTICARRIER MODULATION USING MULTI-TAP FREQUENCY-DOMAIN EQUALIZER AND DECISION FEEDBACK

RELATED APPLICATION DATA

This application claims the benefit of and priority under 35 U.S.C. §119(e) to U.S. Patent Application Serial No. 60/309,631, filed Aug. 2, 2001, entitled "Multicarrier Modulation Method Using Multi-Tap Frequency-Domain Equalization and Decision Feedback," which is incorporated herein by reference in its entirety.

BACKGROUND OF THE INVENTION

1. Field of the Invention

The systems and methods of this invention generally relate to communication systems. In particular, the systems and methods of this invention relate to equalization using decision feedback.

2. Description of Related Art

In multicarrier modulation, a transmission channel is partitioned into a multitude of sub-channels, each with its own associated carrier. In implementations of multicarrier modulation known as discrete multitone (DMT) transmission, or orthogonal frequency division multiplexing (OFDM), the generation and modulation of the sub-channels is accomplished digitally, using an orthogonal transformation on each of a sequence of blocks, i.e., frames, of the data stream. A receiver performs the inverse transformation on segments of the sampled waveform to demodulate the data. In the implementation of DMT used as the signaling standard for asymmetric digital subscriber lines (ADSL), the transforms used for demodulation and modulation are the Discrete Fourier Transform (DFT) and its inverse, respectively. Further information regarding the asymmetric digital subscriber line standard can be found in the article Asymmetric Digital Subscriber Line (ADSL) Metallic Interface, ANSI T1E1.4/94-007R8, 1994, incorporated herein by reference in its entirety.

In another implementation, referred to as discrete wavelet multitone (DWMT) transmission, a discrete wavelet transform and its inverse are employed as discussed in M. A. Tzannes et al, "The DWMT: A Multicarrier Transceiver for ADSL Using M-Band Wavelets," ANSI Standard Committee T1E1.4 contribution 93–067, March 1993, M. A. Tzannes, "System Design Issues for the DWMT Transceiver," ANSI Standard Committee T1E1.4 contribution 93–100, April 1993 and M. A. Tzannes et al, "DMT Systems, DWMT Systems and Digital Filter Banks," Proc. ICC 1994, all of which are incorporated herein by reference in their entirety.

Thus, in a multicarrier system, a communication path having a fixed bandwidth is divided into a number of sub-bands having different frequencies. The width of the sub-bands is chosen to be small enough to allow the distortion in each sub-band to be modeled by a single attenuation and phase shift for the band. If the noise level in each band is known, the volume of data sent in each band may be optimized by choosing a symbol set having the maximum number of symbols consistent with the available signal to noise ratio of the channel. By using each sub-band at its maximum capacity, the amount of data that can be transmitted in the communication path is maximized.

In practice, such systems are implemented by banks of digital filters which make use of Fast Fourier Transforms (FFT). In the case in which a single data stream is to be transmitted over the communication path is broken into M sub-bands, during each communication cycle, the portion of the data stream to be transmitted is converted to M QAM symbols chosen to match the capacity of the various channels.

The time domain signal to be sent on the communication path is obtained by selecting a QAM point on each sub-carrier and then adding the modulation carriers to form the signal to be placed in the communication path. This operation is normally carried out by transforming the vector of M symbols via the inverse Fourier transform to generate N, where N represents the size of the transform, time domain values that are sent in sequence on the communication path. At the other end of the communication path, the N time domain values are accumulated and transformed via a Fourier transform to recover the original M symbols after equalization of the transformed data to correct for the attenuation and phase shifts that may have occurred in the channels.

One type of problem encountered in transmission systems is intersymbol interference (ISI). When the time domain values are transmitted, the values are spread over time by the impulse response of the system. Often, a guard band is included to prevent previous frames from interfering with subsequent frames, but these guard bands are often too small to be sufficient on their own. Also, values from within the same frame can interfere with each other to cause ISI, sometimes referred to as intersubchannel interference. The time domain equalizer works to shorten the overall length of the impulse response but usually does not remove all of the ISI.

Therefore, the symbol decoded by the subscriber will include interference from other symbols in other sub-bands and/or earlier or later symbols transmitted in the subscriber's sub-band. This type of interference is further aggravated by the high side lobes in the sub-bands provided by the Fourier transform. Further information regarding multicarrier transmission systems can be obtained from U.S. Pat. No. 5,636, 246 entitled "Multicarrier Transmission System," incorporated herein by reference in its entirety.

SUMMARY OF THE INVENTION

For an ideal transmission channel, the receiver transform output is a replica of the modulating data, due to the orthogonality (Nyquist) properties of the particular transform used. However, without compensation, as discussed above, the practical channels can contain severe intersubchannel and interframe interference. That is, the receiver transform output for sub-channel $m_1$ and frame $i_1$ has a contribution not only from $s_{i_1}^{m_1}$ but also from $s_i^m$ for $\{m, i\} \neq \{m_1, i_1\}$, where $s_i^m$ denotes the symbol transmitted in sub-channel m for frame i. For sake of clarity, in the following disclosure a distinction between intersubchannel and interframe interference will not be made, but rather the combination of the two referred to as intersymbol interference (ISI). However, it is to be appreciated that the receiver transform outputs can also have contributions from independent background noise, which, also for sake of clarity, will be disregarded for this discussion.

Multicarrier systems typically employ equalization to compensate for the effects of ISI. Such equalization is typically done in the time-domain and in the frequency-domain. For time-domain equalization (TDQ), an adaptive filter is trained then applied to the sequence of samples at the receiver, before the sequence is passed to the receiver transform. For frequency-domain equalization (FDQ), processing is employed on the receiver transform outputs.

Let $S^{m_1}_{i_1}$ denote the actual transmitted symbol, and let $$\hat{s}^{m_1}_{i_1}$$

denote the FDQ output for subchannel $m_1$ and frame $i_1$. The desired net effect of TDQ and FDQ is for $$\hat{s}^{m_1}_{i_1}$$

to be equal to $S^{m_1}_{i_1}$, plus a very small contribution from ISI. The receiver can make a decision about the value for $s^{m_1}_{i_1}$ by quantizing $$\hat{s}^{m_1}_{i_1}$$

to the nearest constellation point. This decision will be denoted by $d_{i_1}^{m_1}$.

Typically, the time-domain equalizer is relied on to perform the bulk of the ISI mitigation, with the frequency domain equalization being used only to perform a phase and amplitude correction for the channel/TDQ combination at the given sub-channel center frequency. In these schemes, each FDQ is implemented as a single-tap complex multiply, applied to the associated sub-channel output.

However, as discussed in U.S. Pat. No. 5,636,246, additional ISI suppression can be obtained by allowing each FDQ to have multiple taps, and combining the receiver transform outputs for several neighboring sub-channel, frame pairs. However, a further reduction in ISI can be achieved by incorporating feedback from one or more neighboring sub-channel, frame pairs in the frequency-domain equalizer combiner.

Accordingly, aspects of the invention relate to reducing intersymbol interference.

Additional aspects of the invention relate to reducing intersymbol interference through the use of feedback.

Additional aspects of the invention relate to reducing intersymbol interference through the use of feedback in a multicarrier environment.

Aspects of the invention further relate to combining multiple FFT outputs as well as decision feedback to create an estimate of a transmitted QAM symbol.

Aspects of the invention additionally relate to using a multi-tap frequency domain equalizer with decision feedback to minimize intersymbol interference in a multicarrier modulation communication system.

These and other features and advantages of this invention are described in, or are apparent from, the following detailed description of the embodiments.

BRIEF DESCRIPTION OF THE DRAWINGS

The embodiments of the invention will be described in detailed, with reference to the following figures, wherein.

DETAILED DESCRIPTION OF THE INVENTION

The exemplary systems and methods of this invention will be described in relation to digital subscriber line communications, and more particularly to multicarrier modulation communications. However, to avoid unnecessarily obscuring the present invention, the following description omits well-known structures and devices that may be shown in block diagram form or otherwise summarized. For the purposes of explanation, numerous specific details are set forth in order to provide a thorough understanding of the present invention. It should be appreciated however that the present invention may be practiced in a variety of ways beyond the specific details. For example, the systems and methods of this invention can generally be applied to any type of communication system including wireless communication systems, such as wireless LANs, power line communications, or any other system or combination of systems that use multicarrier communication or any other form of modulation in which it is desired to reduce intersymbol interference.

Furthermore, while the exemplary embodiments illustrated herein show the various components of the communication system collocated, it is to be appreciated that the various components of the system can be located at distant portions of a distributed network, such as a telecommunications network and/or the Internet, or within a dedicated intersymbol interference reduction module. Thus, it should be appreciated that the components of the communication system can be combined into one or more devices or collocated on a particular node of a distributed network, such as a telecommunications network. As will be appreciated from the following description, and for reasons of computational efficiency, the components of the communication system can be arranged at any location within a distributed network without affecting the operation of the system.

Furthermore, it should be appreciated that the various links connecting the elements can be wired or wireless links, or a combination thereof, or any other known or later developed element(s) that is capable of supplying and/or communicating data to and from the connected elements. Additionally, the term module as used herein can refer to any known or later developed hardware, software, or combination of hardware and software that is capable of performing the functionality associated with that element.

Figure 1:
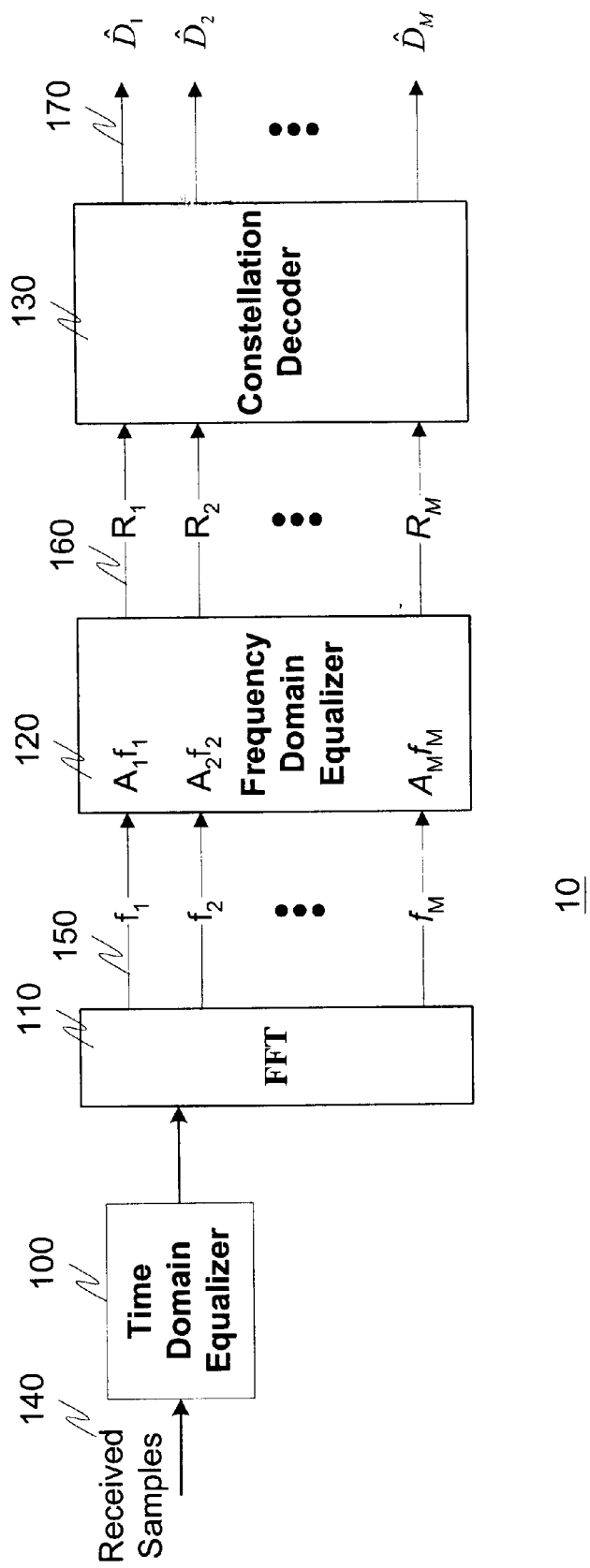
FIG. 1 is a functional block diagram illustrating the equalizer portion of a conventional receiver.

FIG. 1 illustrates a portion of conventional receiver 10. In particular, the receiver 10 comprises a time domain equalizer 100, a fast Fourier transform module 110, a frequency domain equalizer 120 and a constellation decoder 130. As previously discussed, a plurality of received samples 140 are received at the time-domain equalizer 100. The time-domain equalizer 100 applies adaptive filtering to the sequence of samples and passes the sequence to the fast Fourier transform module 110. The fast Fourier transform module 110 outputs a complex output $f_m$ for each tone m in the set of total tones M in each frame. The frequency domain equalizer 120 then performs a single-tap complex multiply to each associated sub-channel resulting in the received point $R_m$ 160. The constellation decoder 130 then determines the constellation point $\hat{D}_m$ closest to the received point $R_m$ for each tone.

In U.S. Pat. No. 5,636,246, it was noted that additional ISI suppression could be obtained by allowing each frequency domain equalizer to have multiple taps and combining the receiver transform outputs for several neighboring subchannel frame pairs.

Let $\theta^m_i$, represent the transform output for subchannel m, in frame i. For the method, discussed in U.S. Pat. No. 5,636,246, the FDQ combiner output for the subchannel, frame pair is:

$$\hat{s}^{m_1}_{i_1} = \sum_{\{m,j\} \in A(m_1)} \lambda^m_j(m_1) \theta^m_{i_1+j} \quad (1)$$

In this expression, $A(m_1)$ is a set containing ordered pairs $\{m, j\}$ of indices corresponding to the particular subchannel, frame pairs for which the receiver transform outputs are used in the FDQ combiner, for subchannel $m_1$. The second element j of the ordered pair is an offset relative to frame $i_1$. The $\lambda^m_j(m_1)$ are the corresponding FDQ combiner weights. The above equation will be referred to as a multi-tap FDQ (MFDQ) in what follows. Note that if $A(m_1)$ consists of the single element $\{m_1, 0\}$, the above equation reduces to the application of a single-tap FDQ.

For the present invention, further improvement can be obtained by incorporating a feedback decision term in the FDQ combiner. The expression for the new combiner is obtained by expanding the equation above, and is rewritten as:

$$\hat{s}^{m_1}_{i_1} = \sum_{\{m,j\} \in A(m_1)} \lambda^m_j(m_1) \theta^m_{i_1+j} + \sum_{\{m,j\} \in B(m_1)} \gamma^m_j(m_1) d^m_{i_1+j} \quad (2)$$

In Eq.2, $B(m_1)$ is a set containing ordered pairs $\{m, j\}$ of indices corresponding to the particular subchannel, frame pairs for which decisions are used in the FDQ combiner for subchannel $m_1$. The $\gamma^m_j$ are the corresponding combiner weights. Note that the sets B(m) must be constructed in an ordered fashion. That is, $B(m_1)$ should contain no ordered pair $\{m, j\}$ for which $$\hat{s}^{m_1}_{i_1}$$

is determined before $$\hat{s}^{m_1}_{i_1+j},$$

in which case the decision feedback term $d^m_{i_1+j}$ would not be available. The method defined by Eq. (2) will be referred to as multi-tap FDQ with decision feedback (MFDQ-DF).

The settings for $\lambda^m_j(m_1)$ and $\gamma^m_j(m_1)$ can be trained during an initialization interval in which the transmitter sends a signal modulated with a symbol sequence $s^m_i$ known to the receiver. Specifically, fix $i_1$ at an arbitrary value and for subchannel $m_1$, let $\omega$ be a vector constructed from the weights $\lambda^m_j(m_1)$ and $\gamma^m_j(m_1)$, and let Y be the vector having the corresponding observation elements $\theta^m_{i_1+j}$ and $d^m_{i_1+j}$. In this construction, $\{m, j\}$ varies over $B(m_1)$ and $A(m_1)$, for the feedback and non-feedback portions, respectively. Note that since the $S^m_{i_1+j}$ are known apriori, they are substituted for the $d^m_{i_1+j}$. A goal for training $\omega$ is to minimize the square of error $e = s^{m_1}_{i_1} - \omega^\dagger Y$, in the average, over several frames $i_1$.

This yields the standard least-squares (LS) solution $$\omega = \Sigma^{-1} \rho,$$

where $\Sigma$ is the sample covariance matrix for Y, and $\rho$ is the sample correlation vector, for $S^{m_1}_{i_1}$ and Y.

By way of simple example Eq. 2 can be rewritten as:

$$R_m = \sum_{k=0}^{N-1} A_{m,k} f_{m-k} + \sum_{k=1}^{L} B_{m,k} \hat{D}_{m-k} \quad (3)$$

where the complex output of the FFT for tone m is given by $f_m$, the complex output of the multi-tap frequency domain equalization with decision feedback (MFDQ-DF) is $R_m$, and $\hat{D}_m$ is the constellation point closest to the received point $R_m$. Note that N and L are variables that determine the number of forward and feedback combiner taps that are being used in the system. Also, note that, for this example, there is no dependence across frames so the subscript i has been removed, and the subscript m moved to the subscript location. For this simple case, the $R_m$ is determined in increasing order such that the feedback values will always be available. Converting from Eq. 2, Y is equivalent B, d is equivalent to $\hat{D}$, $\gamma$ is equivalent to A and $\theta$ is equivalent to $f$. For this particular simple example, the multi-tap and decision feedback equalizer 180 is illustrated with two taps for A and one tap for B. However, it is to be appreciated that this can be adjusted based, for example on the particular application and/or accuracy needed.

Figure 2:
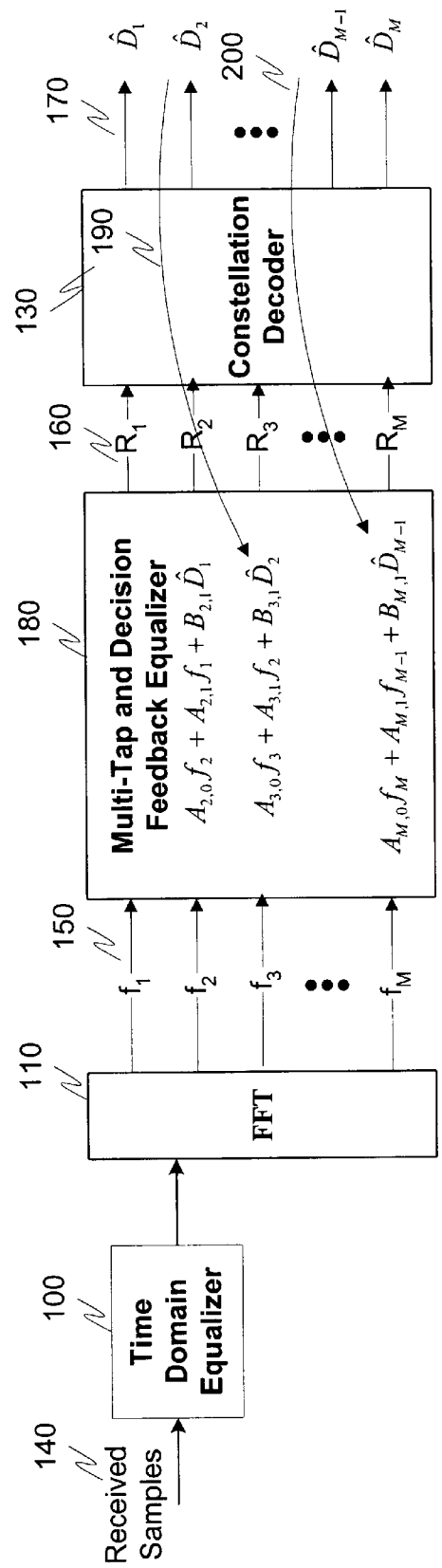
FIG. 2 is a functional block diagram illustrating a portion of a receiver according to this invention.

Specifically, FIG. 2 illustrates graphically how feedback is used in the multi-tap and decision feedback equalizer 180. In particular, FIG. 2 comprises one or more received samples 140, a time-domain equalizer 100, an FFT module 110, a plurality of complex outputs 150, a multi-tap decision feedback equalizer 180, a plurality of determined received points 160 corresponding to a respective tone, a constellation decoder 130 and plurality of output constellation points 170 that were determined to be closest to the received point 160. The operation of the equalizer 180 in FIG. 2 is comparable to that of the equalizer illustrated in FIG. 1, with the exception of constellation points 170 being fed back to aid in determining the $R_m$ for another tone. In this simple particular example, $\hat{D}_2$ 190 is fed back to tone 3 and $\hat{D}_{M-1}$ 200 is fed back to tone N. It is to be appreciated that, in general, $\hat{D}$ can be fed back to any one or more other tones to aid in determining the received point $R_m$. For example, the system can begin with the determination of $\hat{D}_M$ and proceed "backwards" an until $\hat{D}_1$ is determined. Alternatively, the system can jump around between tones with the only limitation being $R_M$ is dependent on decisions made on earlier tones.

Additionally, it is to be appreciated that any $\hat{D}$ can be used as feedback alone or in combination, with other $\hat{D}$'s and, as discussed above, can be either forward looking or backward looking, or a combination thereof, for feedback terms.

Figure 3:
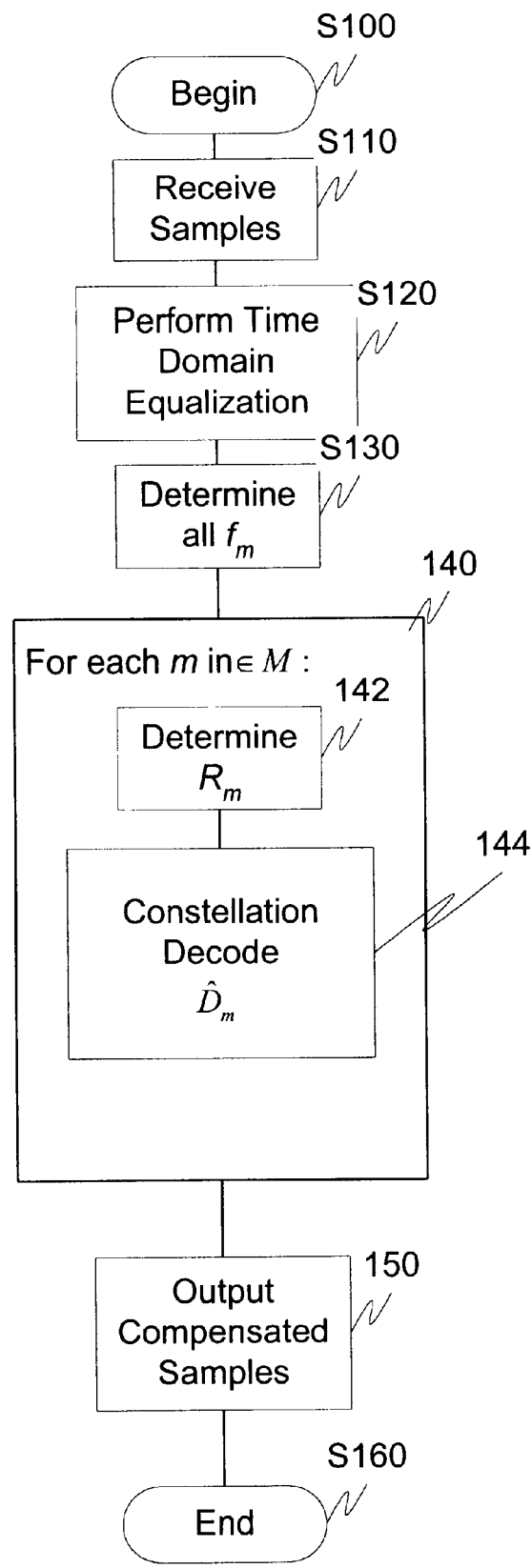
FIG. 3 is a flowchart illustrating an exemplary method for mitigating intersymbol interference according to this invention.

FIG. 3 illustrates an exemplary method of determining intersymbol interference reduced output samples. In particular, control begins in step S100 and continues to step S110. In step S110, one or more samples are received. Next, in step S120, time-domain equalization is performed on the one or more received samples. Then, in step S130, the complex outputs are determined for each tone through the use of a transform, such as a fast Fourier transform, discrete wavelet transform, or like. Control then continues to step S140.

In step S140, for each tone m in the set of total tones M in each frame, step S142 determines the received point and in step S144 the received point $R_m$ is constellation decoded to output the constellation point closest to the received point $R_m$. Control then continues to step S150.

In step S150, the intersymbol interference compensated output samples are output. Control then continues to step S160 where the control sequence ends.

Figure 4:
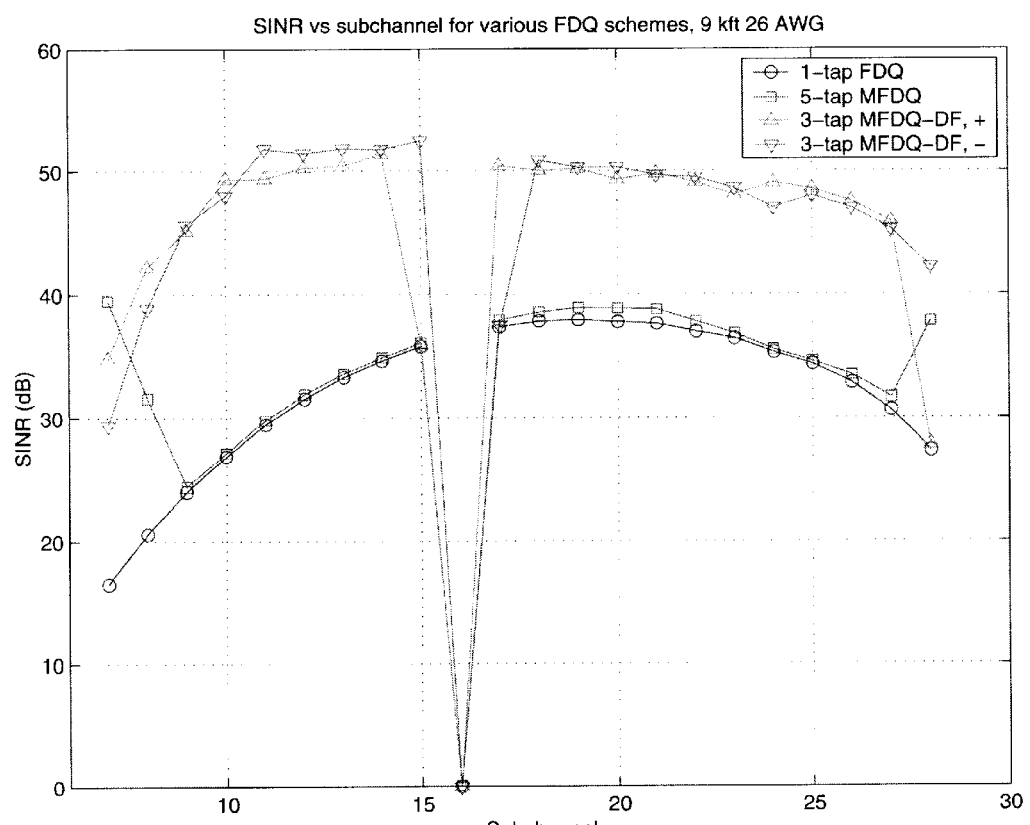
FIG. 4 is a plot illustrating the exemplary benefits achieved in SINR using the systems and methods of this invention.

FIG. 4 illustrates the exemplary advantages of using decision feedback in frequency domain equalization. In particular, FIG. 4 illustrates the SINR verse subchannel outputs for various FDQ schemes over 9 kft. of 26 AWG wire. In particular, these tests were conducted over a multicarrier ADSL system upstream length. Subsequent to each TDQ training session, the FDQ was trained in a least squares fashion using the ADSL medley signal for each of the FDQ schemes discussed above, and the resulting SINR profiles plotted. As illustrated in FIG. 4, the SINR verse subchannel is illustrated (note subchannel 16 was not used).

For the curve labeled "5-tap MFDQ", $A(m_1)$ comprises the 5 ordered paris $\{m, 0\}$ with $m_1-2 \leq m \leq m_1+2$. For the curve labeled "3-tap MFDQ-FB+", $A(m_1)$ comprises the two ordered pairs $\{m_1, 0\}$ and $\{m_1+1, 0\}$, and $B(m_1)$ contains only the single pair $\{m_1+1, 0\}$. For the curve labeled "3-tap MFDQ-FB-", $A(m_1)$ comprises the two ordered pairs $\{m_1, 0\}$ and $\{m_1-1, 0\}$, and $B(m_1)$ contains only the single pair $\{m_1-1, 0\}$. Modest improvement is noted as the single-tap FDQ is expanded to 5 MFDQ taps.

However, large additional improvement is noted when either of the MFDQ-DF schemes are used. To adhere to the causality requirements for the $B(m)$, a normal 1-tap FDQ, or an MFDQ, depending on $A(m)$, can be used for the uppermost subchannel in the "3-tap MFDQ-FB+" scheme, and the lowermost subchannel in the "3-tap MFDQ-FB-" scheme.

The above-described intersymbol interference reduction system can be implemented on a telecommunications device, such a modem, a DSL modem, an ADSL modem, a multicarrier transceiver, a VDSL modem, or the like, or on a separate programmed general purpose computer having a communications device. However, the systems and methods of this invention can also be implemented on a special purpose computer, a programmed microprocessor or microcontroller and peripheral integrated circuit element, and ASIC or other integrated circuit, a digital signal processor, a hard-wired electronic or logic circuit such as discrete element circuit, a programmable logic device such as PLD, PLA, FPGA, PAL, modem, receiver, or the like. In general, any device capable of implementing a state machine that is in turn capable of implementing the flowchart illustrated herein can be used to implement the various intersymbol interference reduction methods according to this invention.

Furthermore, the disclosed methods may be readily implemented in software using object or object-oriented software development environments that provide portable source code that can be used on a variety of computer or workstation hardware platforms. Alternatively, the disclosed intersymbol interference reduction system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The intersymbol interference reduction systems and methods illustrated herein however can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software executed on programmed general purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated intersymbol interference reduction system, or the like. The intersymbol interference reduction system can also be implemented by physically incorporating the system and method into a software and/or hardware system, such as the hardware and software systems of a communications transceiver.

It is, therefore, apparent that there has been provided, in accordance with the present invention, systems and methods for intersymbol interference reduction. While this invention has been described in conjunction with a number of embodiments, it is evident that many alternatives, modifications, and variations would be or are apparent to those of ordinary skill in the applicable arts. Accordingly, it is intended to embrace all such alternatives, modifications, equivalents and variations that are within the spirit and scope of this invention.

We claim:

1. An intersymbol interference reduction system comprising:
    a frequency domain equalizer; and
    a constellation decoder, the frequency domain equalizer determining at least one received point based at least on at least one previously determined constellation point wherein a sub-channel output for the frequency domain equalizer for a subchannel $m_1$ and frame $i_1$ are determined in accordance with:

$$\hat{s}_{i_1}^{m_1} = \sum_{\{m,j\} \in A(m_1)} \lambda_j^m(m_1) \theta_{i_1+j}^m + \sum_{\{m,j\} \in B(m_1)} \gamma_j^m(m_1) d_{i_1+j}^m$$

where $A(m_1)$ is a set containing ordered pairs $\{m, j\}$ of indices corresponding to the particular subchannel, frame pairs for which the receiver transform outputs are used in the frequency domain equalizer, for subchannel $m_1$, $B(m_1)$ is a set containing ordered pairs $\{m, j\}$ of indices corresponding to the particular subchannel, frame pairs for which decisions are used in the frequency domain equalizer for subchannel $m_1$, $\lambda_j^m(m_1)$ are the corresponding frequency domain equalizer weights, $\theta_i^m$ represents the transform output for subchannel m, in frame i, $\gamma_j^m$ is the corresponding combiner weights and $d_{i_1}^{m_1}$ is a value for $s_{i_1}^{m_1}$ determined by quantizing $$\hat{s}_{i_1}^{m_1}$$

to the nearest constellation point.

2. A method for reducing intersymbol interference comprising:
    determining at least one constellation point; and
    determining at least one received point based at least on at least one previously determined constellation point, wherein a sub-channel output for a frequency domain equalizer for a subchannel $m_1$ and frame $i_1$ are determined in accordance with:

$$\hat{s}_{i_1}^{m_1} = \sum_{\{m,j\} \in A(m_1)} \lambda_j^m(m_1)\theta_{i_1+j}^m + \sum_{\{m,j\} \in B(m_1)} \gamma_j^m(m_1)d_{i_1+j}^m$$

where $A(m_1)$ is a set containing ordered pairs $\{m, j\}$ of indices corresponding to the particular subchannel, frame pairs for which the receiver transform outputs are used in the frequency domain equalizer, for subchannel $m_1$, $B(m_1)$ is a set containing ordered pairs $\{m, j\}$ of indices corresponding to the particular subchannel, frame pairs for which decisions are used in the frequency domain equalizer for subchannel $m_1$, $\lambda_j^m(m_1)$ are the corresponding frequency domain equalizer weights, $\theta_i^m$ represents the transform output for subchannel m, in frame i, $\gamma_j^m$ is the corresponding combiner weights and $d_{i_1}^{m_1}$ is a value for $s_{i_1}^{m_1}$ determined by quantizing $$\hat{s}_{i_1}^{m_1}$$

to the nearest constellation point.

3. An intersymbol interference reduction system comprising:
   means for determining at least one constellation point; and
   means for determining at least one received point based at least on at least one previously determined constellation point, wherein a sub-channel output for a frequency domain equalizer for a subchannel $m_1$ and frame $i_1$ are determined in accordance with:

$$\hat{s}_{i_1}^{m_1} = \sum_{\{m,j\} \in A(m_1)} \lambda_j^m(m_1)\theta_{i_1+j}^m + \sum_{\{m,j\} \in B(m_1)} \gamma_j^m(m_1)d_{i_1+j}^m$$

where $A(m_1)$ is a set containing ordered pairs $\{m, j\}$ of indices corresponding to the particular subchannel, frame pairs for which the receiver transform outputs are used in the frequency domain equalizer, for subchannel $m_1$, $B(m_1)$ is a set containing ordered pairs $\{m, j\}$ of indices corresponding to the particular subchannel, frame pairs for which decisions are used in the frequency domain equalizer for subchannel $m_1$, $\lambda_j^m(m_1)$ are the corresponding frequency domain equalizer weights, $\theta_i^m$ represents the transform output for subchannel m, in frame i, $\gamma_j^m$ is the corresponding combiner weights and $d_{i_1}^{m_1}$ is a value for $s_{i_1}^{m_1}$ determined by quantizing $$\hat{s}_{i_1}^{m_1}$$

to the nearest constellation point.

4. An information storage media comprising information for reducing intersymbol interference comprising:
   information that determines at least one constellation point; and
   information that determines at least one received point based at least on at least one previously determined constellation point, wherein a sub-channel output for a frequency domain equalizer for a subchannel $m_1$ and frame $i_1$ are determined in accordance with:

$$\hat{s}_{i_1}^{m_1} = \sum_{\{m,j\} \in A(m_1)} \lambda_j^m(m_1)\theta_{i_1+j}^m + \sum_{\{m,j\} \in B(m_1)} \gamma_j^m(m_1)d_{i_1+j}^m$$

where $A(m_1)$ is a set containing ordered pairs $\{m, j\}$ of indices corresponding to the particular subchannel, frame pairs for which the receiver transform outputs are used in the frequency domain equalizer, for subchannel $m_1$, $B(m_1)$ is a set containing ordered pairs $\{m, j\}$ of indices corresponding to the particular subchannel, frame pairs for which decisions are used in the frequency domain equalizer for subchannel $m_1$, $\lambda_j^m(m_1)$ are the corresponding frequency domain equalizer weights, $\theta_i^m$ represents the transform output for subchannel m, in frame i, $\gamma_j^m$ is the corresponding combiner weights and $d_{i_1}^{m_1}$ is a value for $s_{i_1}^{m_1}$ determined by quantizing $$\hat{s}_{i_1}^{m_1}$$

to the nearest constellation point.

* * * * *